US010533812B2

(12) United States Patent
Baxter et al.

(10) Patent No.: US 10,533,812 B2
(45) Date of Patent: Jan. 14, 2020

(54) SLURRY DROPLET MELTING HEAT EXCHANGE

(71) Applicants: Larry Baxter, Orem, UT (US); Jacom Chamberlain, Provo, UT (US); Nathan Davis, Bountiful, UT (US)

(72) Inventors: Larry Baxter, Orem, UT (US); Jacom Chamberlain, Provo, UT (US); Nathan Davis, Bountiful, UT (US)

(73) Assignee: Hall Labs LLC, Provo, UT (US)

( * ) Notice: Subject to any disclaimer, the term of this patent is extended or adjusted under 35 U.S.C. 154(b) by 174 days.

(21) Appl. No.: 15/719,016

(22) Filed: Sep. 28, 2017

(65) Prior Publication Data

US 2019/0093967 A1    Mar. 28, 2019

(51) Int. Cl.
*B01F 3/04* (2006.01)
*B01D 47/06* (2006.01)
*F28F 25/02* (2006.01)
*F25J 1/00* (2006.01)
*F28C 3/06* (2006.01)
*F28C 3/12* (2006.01)

(52) U.S. Cl.
CPC .............. *F28F 25/02* (2013.01); *B01D 47/06* (2013.01); *B01F 3/04* (2013.01); *F25J 1/0022* (2013.01); *F28C 3/06* (2013.01); *F28C 3/12* (2013.01)

(58) Field of Classification Search
CPC .................................. B01F 3/04; B01D 47/06
USPC .......................................................... 261/115
See application file for complete search history.

(56) References Cited

U.S. PATENT DOCUMENTS

2010/0229725 A1*   9/2010  Farsad ............... B01D 53/1456
                                                                   96/74

* cited by examiner

*Primary Examiner* — Robert A Hopkins

(57) ABSTRACT

Devices, systems, and methods for cooling a gas is disclosed. A slurry is passed through a droplet generating device to produce droplets of the slurry. The slurry comprises a contact liquid and solids. A melting point of the solids is higher than a vaporization point of the contact liquid. A carrier gas is passed across the droplets to exchange heat between the carrier gas and the droplets. At least a portion of the heat transferred to the droplets melts the solids.

15 Claims, 7 Drawing Sheets

SLURRY DROPLET MELTING HEAT EXCHANGE

GOVERNMENT INTEREST STATEMENT

This invention was made with government support under DE-FE0028697 awarded by the Department of Energy. The government has certain rights in the invention.

FIELD OF THE INVENTION

The devices, systems, and methods described herein relate generally to cooling of gases. More particularly, the devices, systems, and methods described herein relate to cooling gases utilizing a phase change.

BACKGROUND

Cooling of gases is a requirement in nearly every industry, and the means to do so vary greatly between industries. A common method is direct-contact exchange between the gas and a liquid, either in a bubbler or a spray tower. These methods suffer from limitations on heat absorption capacity in the liquid. A method to bypass this limitation is needed.

SUMMARY

A method for cooling a gas is disclosed. A slurry is passed through a droplet generating device to produce droplets of the slurry. The slurry comprises a contact liquid and solids. A melting point of the solids is higher than a vaporization point of the contact liquid. A carrier gas is passed across the droplets to exchange heat between the carrier gas and the droplets, cooling the gas. At least a portion of the heat transferred to the droplets melts the solids in the slurry.

The contact liquid may comprise water, hydrocarbons, liquid ammonia, liquid carbon dioxide, cryogenic liquids, or combinations thereof. The solids may comprise carbon dioxide, nitrogen oxide, sulfur dioxide, nitrogen dioxide, sulfur trioxide, hydrogen sulfide, hydrogen cyanide, water, hydrocarbons, or combinations thereof. The carrier gas may comprise combustion flue gas, syngas, producer gas, natural gas, steam reforming gas, light gases, refinery off-gases, acid gases, hydrogen cyanide, water, hydrocarbons, or combinations thereof wherein the acid gases comprise carbon dioxide, nitrogen oxide, sulfur dioxide, nitrogen dioxide, sulfur trioxide, hydrogen sulfide, or a combination thereof. Mass may be exchanged between the carrier gas and the droplets. The acid gases may desublimate, freeze, condense, or absorb into the droplets.

The droplet generating device may comprise a drip tray, spray nozzles, a protrusion droplet generator, capillary tubes, or combinations thereof. The droplet generating device may be installed in a direct-contact exchanger. The direct-contact exchanger may comprise a counter-current, a co-current, or a cross-current flow relative to the droplets. The contact liquid and melted solids may be cooled through a heat exchanger, freezing the melted solids and forming the slurry. The direct-contact exchanger may comprise a spray tower, an absorption tower, a combustor, a prilling tower, a packed column, or combinations thereof. The spray tower may further comprise a bubbler section. The spray tower may comprise a plurality of horizontal stages, the droplets from a first stage collected and fed to a next stage. The protrusion droplet generator may comprise an opening through which a protrusion passes ending at a tip below the opening, the slurry passing through the opening and flowing along the protrusion, forming droplets that fall from the tip. The protrusion may be attached to a plate mounted above the opening. The protrusion may be attached to an interior side of the opening.

The contact liquid and the melted solids may be substantially immiscible near the melting point of the solids. The contact liquid and the melted solids may be separated through a liquid-liquid separator.

The contact liquid may be more volatile than the melted solids and the contact liquid may at least partially vaporize into the carrier gas.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the described devices, systems, and methods.

Combustion flue gas consists of the exhaust gas from a fireplace, oven, furnace, boiler, steam generator, or other combustor. The combustion fuel sources include coal, hydrocarbons, and bio-mass. Combustion flue gas varies greatly in composition depending on the method of combustion and the source of fuel. Combustion in pure oxygen produces little to no nitrogen in the flue gas. Combustion using air (which is typically 78% nitrogen and 20% oxygen, for example) leads to the majority of the flue gas consisting of nitrogen. The non-nitrogen flue gas consists of mostly carbon dioxide, water, and sometimes unconsumed oxygen. Small amounts of carbon monoxide, nitrogen oxides, sulfur dioxide, hydrogen sulfide, and trace amounts of hundreds of other chemicals are present, depending on the source. Entrained dust and soot will also be present in all combustion flue gas streams. The systems, methods, and devices disclosed herein apply to any combustion flue gases.

It is appreciated that dried combustion flue gas has had the water removed.

Syngas consists of hydrogen, carbon monoxide, and carbon dioxide.

Producer gas consists of a fuel gas manufactured from materials such as coal, wood, or syngas. It consists mostly of carbon monoxide, with tars and carbon dioxide present as well.

Steam reforming is the process of producing hydrogen, carbon monoxide, and other compounds from hydrocarbon fuels, including natural gas. The steam reforming gas referred to herein consists primarily of carbon monoxide and hydrogen, with varying amounts of carbon dioxide and water.

Light gases include gases with higher volatility than water, including hydrogen, helium, carbon dioxide, nitrogen, and oxygen. This list is for example only and should not be implied to constitute a limitation as to the viability of other gases in the process. A person of skill in the art would be able to evaluate any gas as to whether it has higher volatility than water.

Refinery off-gases comprise gases produced by refining precious metals, such as gold and silver. These off-gases tend to contain significant amounts of mercury and other metals.

Figure 1:
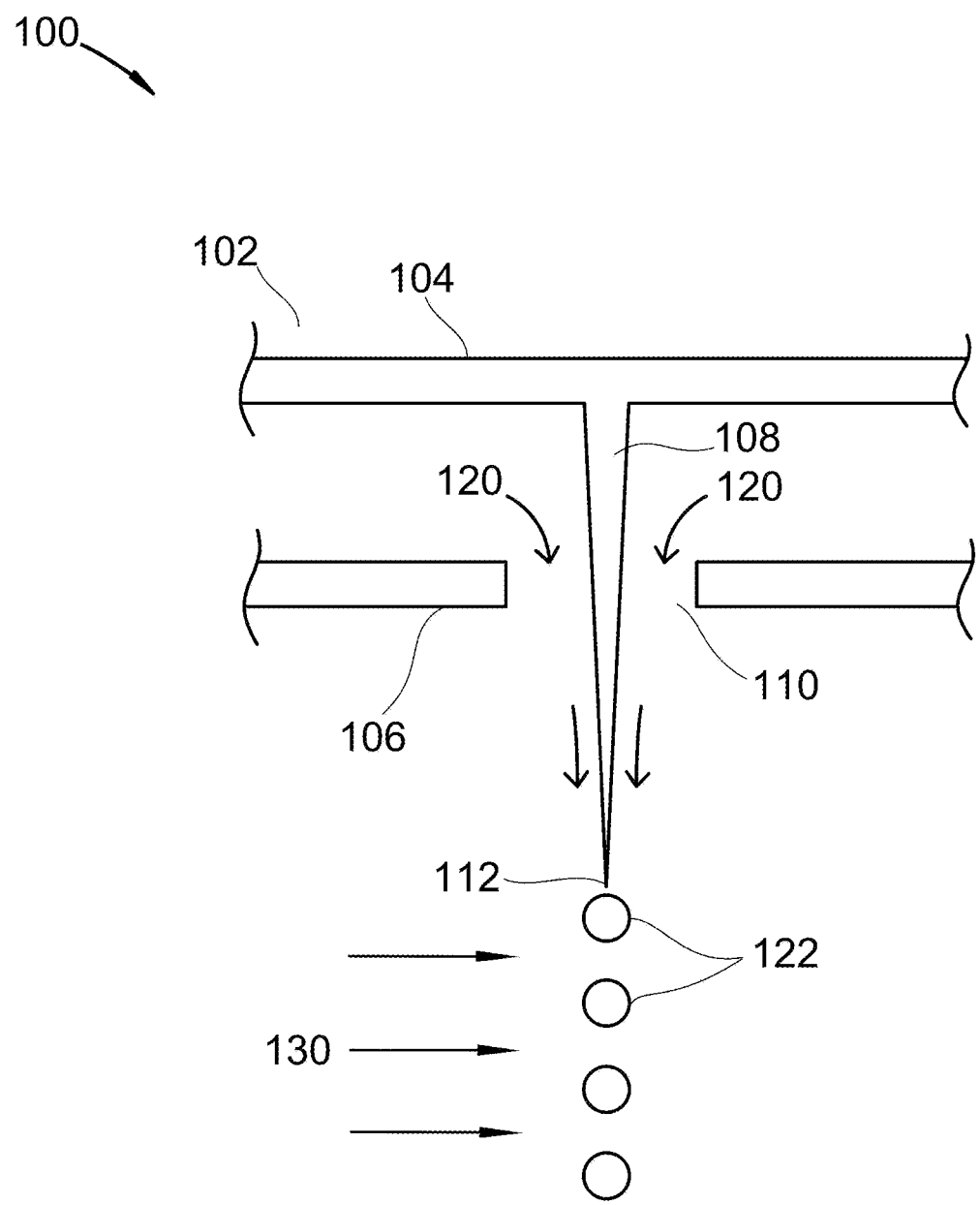
FIG. 1 shows a droplet-generating device.

Referring now to the Figures, FIG. 1 is a perspective view 100 of a protrusion droplet generator 102 that may be used in the described devices, systems, and methods. Protrusion droplet generator 102 comprises top plate 104 and bottom plate 106. Opening 110 goes through bottom plate 106. Protrusion 108 passes through opening 110, ending at tip 112. Protrusion 108 is mounted on top plate 104. Slurry 120 is passed across bottom plate 106 and through opening 110. Slurry 120 flows along protrusion 108 and forms droplets 122 at tip 112. Droplets 122 reach a consistent size and fall. Due to the nature of droplet behavior at tips of protrusions, droplet 122 will fall at substantially the same size each time. By keeping the flow rate of slurry 120 consistent, droplets 122 will fall at an even time interval. Slurry 120 comprises a contact liquid and solids. The melting point of the solids is lower than the vaporization point of the contact liquid. Carrier gas 130 passes in a cross-flow manner across droplets 122, exchanging heat, which cools the carrier gas 130. At least a portion of the heat melts the solids resulting in a product liquid comprising the contact liquid and melted solids. Because the latent heat of melting of the solids is greater than the sensible heat available from the contact liquid, the solids act as a "reservoir" that absorbs heat as it melts without changing the temperature of the contact liquid past the melting temperature of the solids until all of the solids are melted. In other words, the contact liquid does not heat up or vaporize until all of the solids are melted. In some embodiments, vaporization of the contact liquid is desirable, but will not occur until all of the solids are melted. In other embodiments, vaporization of the liquids is not desirable, and so the rate at which carrier gas 130 passes across droplets 122 is controlled such that the solids are melted, but the contact liquid is not heated.

As an illustrative example, slurry 120 could comprise a hydrocarbon, such as heptane, as the contact liquid, with frozen acid gases, such as carbon dioxide, entrained in the heptane as the solid. Carrier gas 130 could comprise a combustion flue gas. In this example, the combustion flue gas could be pre-cooled by the heptane/carbon dioxide slurry, but stripping of heptane into the combustion flue gas would be counterproductive, as the eventual goal would be a stripped-flue gas comprising substantially only nitrogen. By passing the combustion flue gas across the slurry, the carbon dioxide is melted, but the heptane is not vaporized.

As another illustrative example, a eutectic mixture of water and lithium chloride could act as the contact liquid, with water ice as the solid. The carrier gas could be a hot natural gas stream. By passing the hot natural gas across the eutectic mixture, the natural gas would be cooled, and not only would the natural gas not pick up water vapor from the eutectic mixture, but any latent water vapor present in the hot natural gas be stripped into the eutectic mixture.

Figure 2:
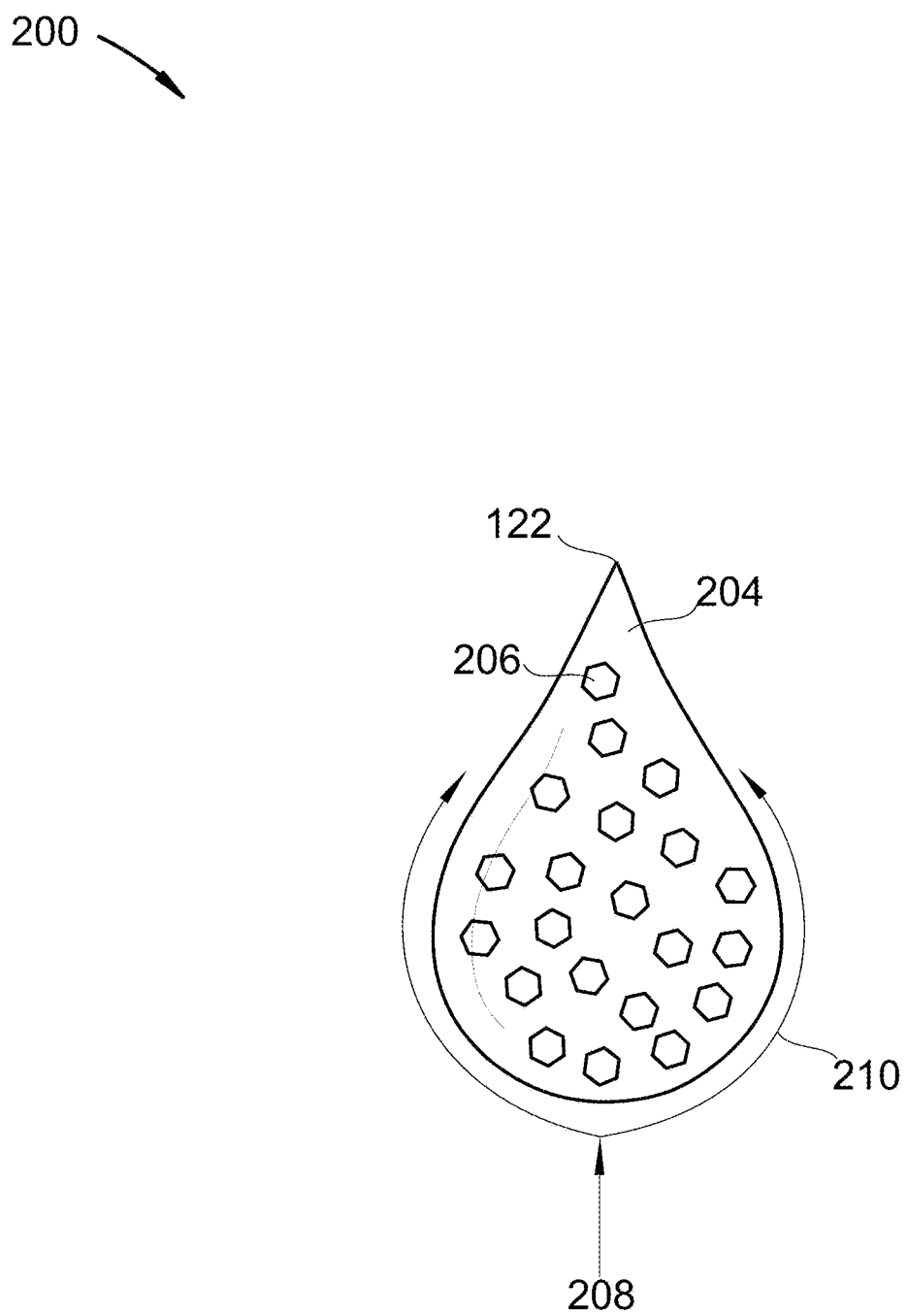
FIG. 2 shows a droplet.

Referring to FIG. 2, FIG. 2 is a perspective view 200 of a droplet, such as droplet 122 of FIG. 1, that may be used in the described devices, systems, and methods. A slurry is passed through a droplet generating device, such as protrusion droplet generator 102, to produce droplets 122 of the slurry. The slurry comprises contact liquid 204 and solids 206. The melting point of solids 206 is higher than the vaporization point of contact liquid 204. Carrier gas 208 is passed counter-current across (210) droplets 122 to exchange heat between carrier gas 208 and droplets 202. In some embodiments, carrier gas 208 passes cross or co-current to droplets 122. At least a portion of the heat transferred to droplets 122 melts solids 206. Because the latent heat of melting of solids 206 is greater than the sensible heat available from contact liquid 204, solids 206 act as a "reservoir" that absorbs heat as it melts without changing the temperature of contact liquid 204 past the melting temperature of solids 206 until all of solids 206 are melted. In some embodiments, both heat and mass transfer occur between carrier gas 208 and droplets 202.

Figure 3:
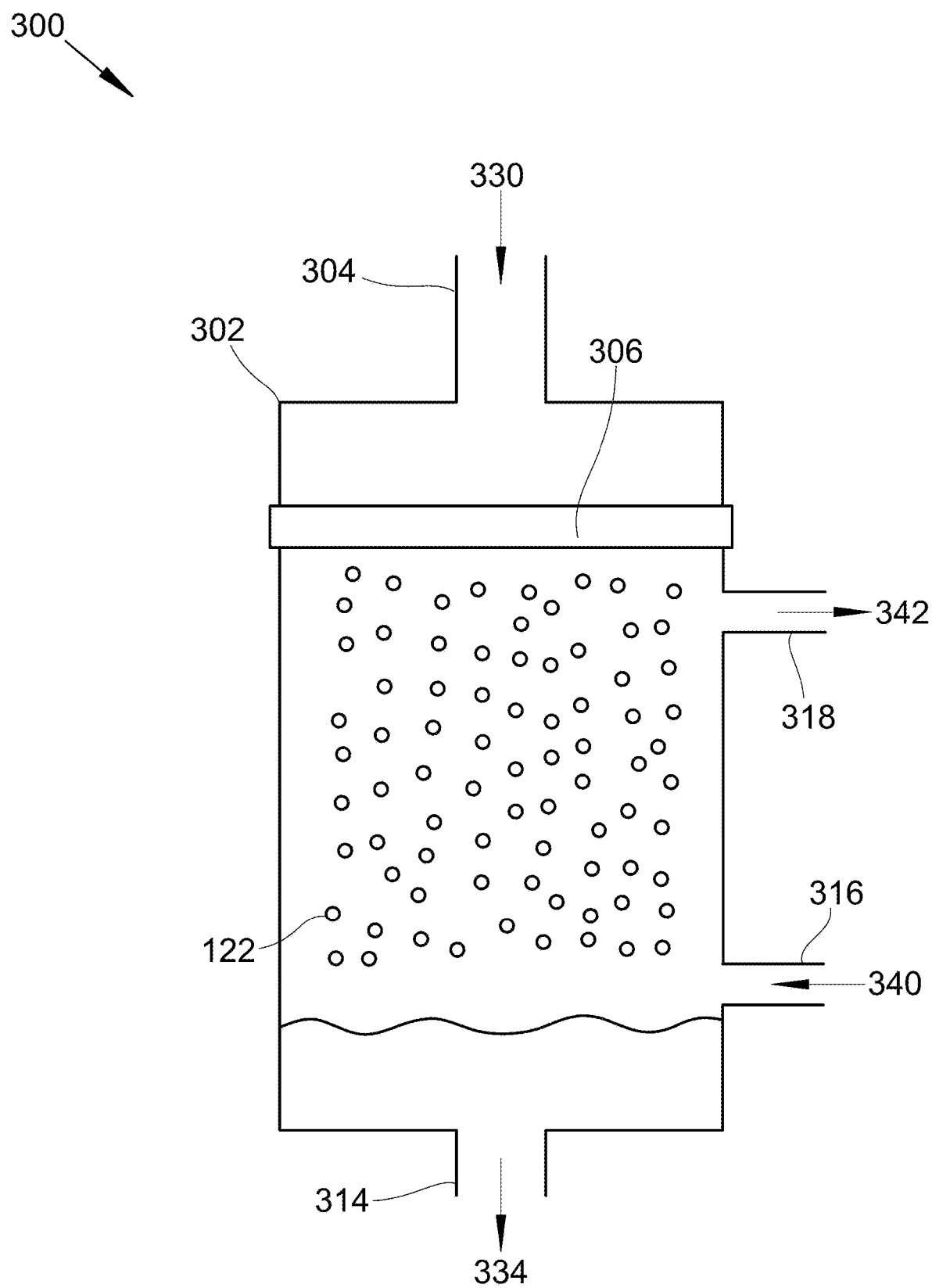
FIG. 3 shows a cross-sectional view of a spray tower.

Referring to FIG. 3, FIG. 3 is a cross-sectional view 300 of a spray tower that may be used in the described devices, systems, and methods. Spray tower 302 comprises drip tray 306, fluid inlet 304, liquid outlet 314, gas inlet 316, and gas outlet 318. Slurry 330 enters exchanger 302 through fluid inlet 304 and passes through drip tray 306, producing droplets 332. Slurry 330 comprises a contact liquid and solids. The melting point of the solids is lower than the vaporization point of the contact liquid. Carrier gas 340 enters exchanger 302 through gas inlet 316 and passes counter-current across the descending droplets 332, exchanging heat between droplets 332 and carrier gas 340, which cools the carrier gas 340. Cooled carrier gas 342 exits through gas outlet 318. The solids melt from at least a portion of the heat transferred from carrier gas 340 and leave through liquid outlet 314 as product liquid 334. Product liquid 334 comprises the contact liquid and the melted solids. Because the latent heat of melting of the solids is greater than the sensible heat available from the contact liquid, the solids act as a "reservoir" that absorbs heat as it melts without changing the temperature of the contact liquid past the melting temperature of the solids until all of the solids are melted.

Figure 4:
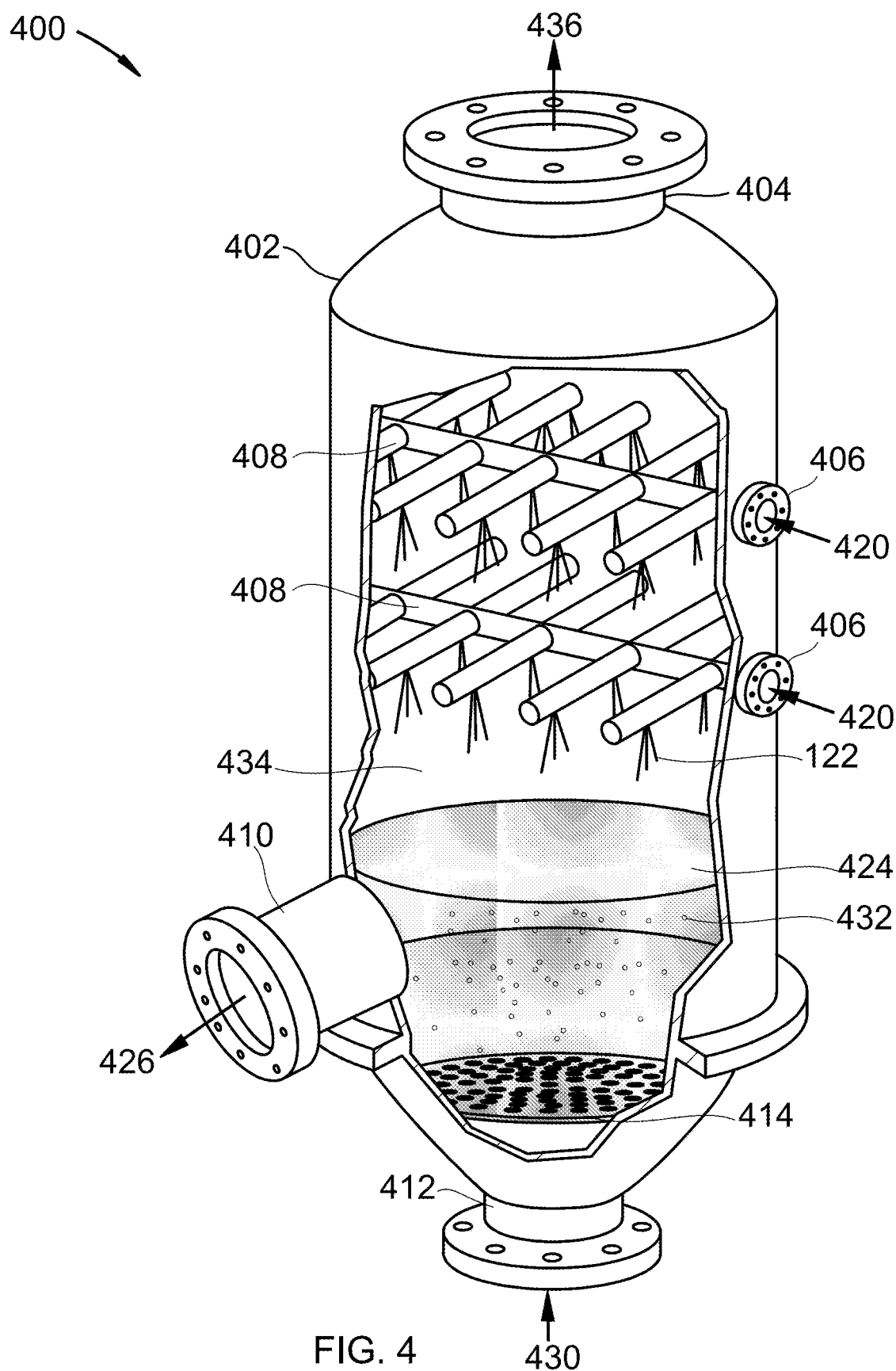
FIG. 4 shows a cutaway isometric view of a combined bubbler and spray tower.

Referring to FIG. 4, FIG. 4 is a cutaway isometric view 400 of a combined bubbler and spray tower that may be used in the described devices, systems, and methods. Exchanger 402 comprises fluid inlets 406, nozzles 408, gas inlet 412, bubble tray 414, gas outlet 404, and liquid outlet 410. Carrier gas 430 comprises, in this instance, a natural gas stream with carbon dioxide contaminant. Slurry 420 comprises, in this instance, a eutectic mixture of water and lithium chloride as the contact liquid with water ice as the solid. Carrier gas is passed through gas inlet 412 and through bubble tray 414, producing bubbles 432, which bubble through a melted-solids bottoms liquid 424. Bottoms liquid 424 exchanges heat with and strips carbon dioxide from bubbles 432, producing CO2-enriched, melted-solids product liquid 426, and CO2-depleted natural gas 434. Slurry 420 enters exchanger 402 through fluid inlets 406 and passes through nozzles 408, producing droplets 122, as in FIG. 2. The melting point of the water ice is lower than the vaporization point of the eutectic liquid. Droplets 122 descend against CO2-depleted natural gas 434 and exchange heat with and strip carbon dioxide from CO2-depleted natural gas 434, at least a portion of the heat melting the water ice and producing bottoms liquid 424 and CO2-stripped-carrier gas 436, which leaves exchanger 402 through gas outlet 404. Stripped-carrier gas 436 has had substantially all of the vapor component removed. Because the latent heat of melting of the water ice is greater than the sensible heat available from the eutectic mixture, the water ice acts as a "reservoir" that absorbs heat as it melts without changing the temperature of the eutectic mixture past the melting temperature of the water ice until all of the solids are melted. As it is a eutectic mixture, this temperature is greatly reduced from pure water ice. Bottoms liquid 424 is, therefore, still at the same temperature as slurry 420. As such, carrier gas 430 is pre-cooled by bottoms liquid 424, absorbing sensible heat from gas-liquid exchange before absorbing the latent heat available in droplets 122.

Figure 5:
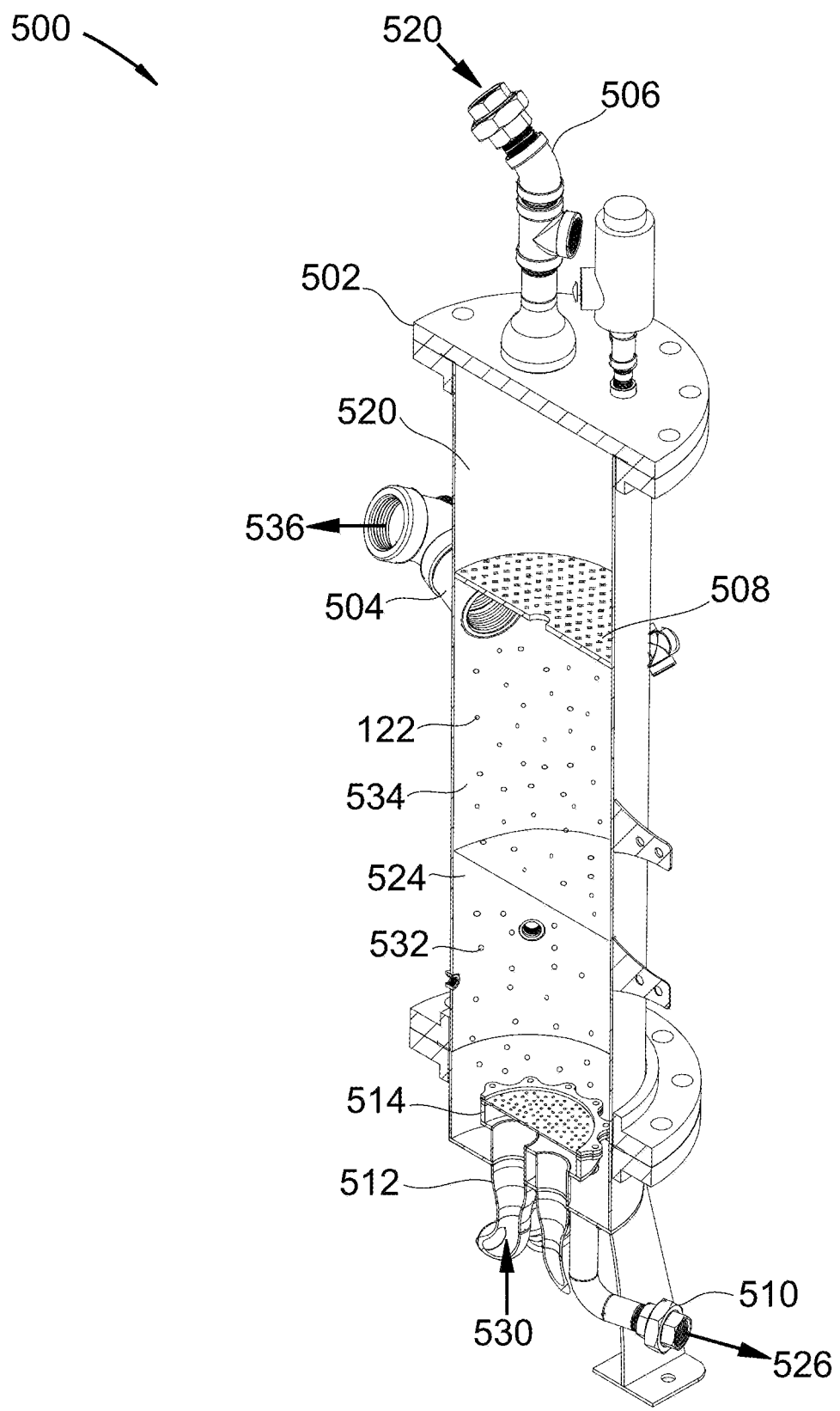
FIG. 5 shows a cutaway isometric view of a combined bubbler and spray tower.

Referring to FIG. 5, FIG. 5 is a cutaway isometric view of a combined bubbler and spray tower 500 that may be used in the described devices, systems, and methods. Exchanger 502 comprises fluid inlet 506, drip tray 508, gas inlet 512, bubble tray 514, gas outlet 504, and liquid outlet 510. Carrier gas 530 is passed through gas inlet 512 and through bubble tray 514, producing bubbles 532 which bubble through bottoms liquid 524. Bottoms liquid 524 exchanges heat and materials with bubbles 532, producing product liquid 526 and middle gas 534. Slurry 520 enters exchanger 502 through fluid inlet 506 under pressure and is pressed through drip tray 508, producing droplets 122. Slurry 520 comprises a contact liquid and solids. The melting point of the solids is higher than the vaporization point of the contact liquid. Droplets 122 descend against middle gas 534 and exchange heat and materials with middle gas 534, at least a portion of the heat melting the solids and producing bottoms liquid 524 and stripped-carrier gas 536, which leaves exchanger 502 through gas outlet 504. Bottoms liquid 524 comprises the contact liquid and the melted solids. Because the latent heat of melting of the solids is greater than the sensible heat available from the contact liquid, the solids act as a "reservoir" that absorbs heat as it melts without changing the temperature of the contact liquid past the melting temperature of the solids until all of the solids are melted.

Figure 6:
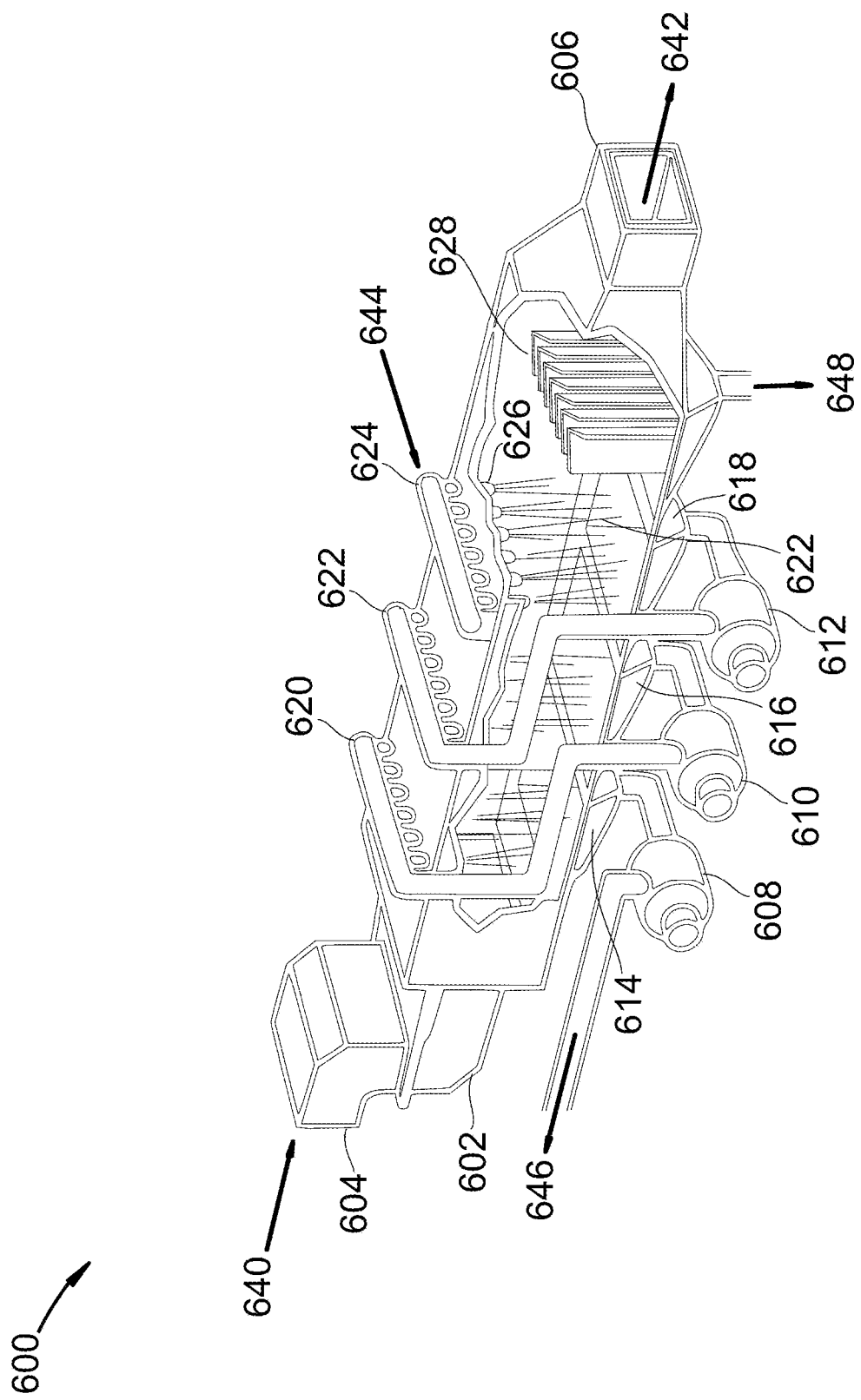
FIG. 6 shows a cutaway isometric view of a cross-flow exchanger.

Referring to FIG. 6, FIG. 6 is a cutaway isometric view of a cross-flow exchanger 600 that may be used in the described devices, systems, and methods. Cross-flow horizontal spray vessel 602 comprises gas inlet 604, gas outlet 606, mist eliminator 628, and three sections. Each section comprises a pump, 608, 610, and 612, a collection hopper, 614, 616, and 618, and a spray nozzle bank, 620, 622, and 624, respectively. Each spray nozzle bank comprises six spray nozzles 626. Carrier gas 640 enters vessel 602 through gas inlet 604. Slurry 644 enters vessel 602 by passing through spray nozzle bank 624 and passes through nozzles 626 into the third section, forming spray 630 which collects in collection hopper 618. Slurry 644 is pumped by pump 612 through nozzle bank 622 and nozzles 626 into the second section, again forming spray 630 which collects in collection hopper 616. Slurry 644 comprises a contact liquid and solids. The melting point of the solids is higher than the vaporization point of the contact liquid. Slurry 644 is pumped by pump 610 through nozzle bank 620 and nozzles 626 into the first section, again forming spray 630 which collects in collection hopper 614. Carrier gas 640 passes through each of these sections in order, from first through third, and exchanges heat with spray 630. By collection hopper 614 at least a portion of the heat from carrier gas 640 melts all of the solids, resulting in product liquid 646, comprising the contact liquid and the melted solids. Product liquid 646 is pumped by pump 608 out of vessel 602. Carrier gas 640 is passed through mist eliminator 628 and out of gas outlet 606. Because the latent heat of melting of the solids is greater than the sensible heat available from the contact liquid, the solids act as a "reservoir" that absorbs heat as it melts without changing the temperature of the contact liquid past the melting temperature of the solids until all of the solids are melted.

Figure 7:
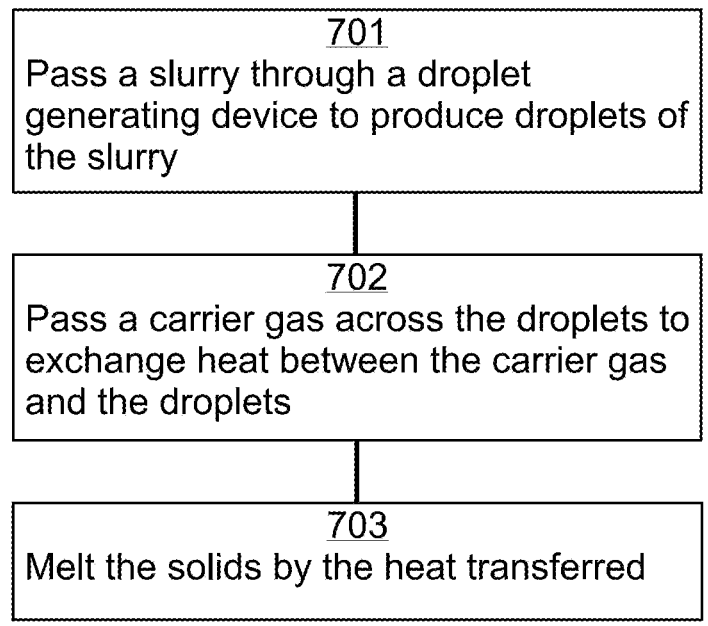
FIG. 7 shows a method for cooling a gas.

Referring to FIG. 7, FIG. 7 is a method 700 for cooling a gas. A slurry is passed through a droplet generating device to produce droplets of the slurry 701. The slurry comprises a contact liquid and solids. A melting point of the solids is higher than a vaporization point of the contact liquid. A carrier gas is passed across the droplets to exchange heat between the carrier gas and the droplets 702. At least a portion of the heat transferred to the droplets melts the solids 703.

In some embodiments, the contact fluid comprises a mixture of a solvent and a compound. The solvent comprises water, hydrocarbons, liquid ammonia, liquid carbon dioxide, cryogenic liquids, or combinations thereof. The compound comprises ionic compounds or organic compounds. The ionic compounds comprise potassium carbonate, potassium formate, potassium acetate, calcium magnesium acetate, magnesium chloride, sodium chloride, lithium chloride, calcium chloride, or combinations thereof. The organic compounds comprise glycerol, ammonia, propylene glycol, ethylene glycol, ethanol, methanol, hydrocarbons, or combinations thereof.

In some embodiments, the contact liquid comprises water, hydrocarbons, liquid ammonia, liquid carbon dioxide, cryogenic liquids, or combinations thereof. In some embodiments, the hydrocarbons comprise 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof.

In some embodiments, the solids comprise carbon dioxide, nitrogen oxide, sulfur dioxide, nitrogen dioxide, sulfur trioxide, hydrogen sulfide, hydrogen cyanide, water, hydrocarbons, or combinations thereof. In some embodiments, the carrier gas comprises combustion flue gas, syngas, producer gas, natural gas, steam reforming gas, light gases, refinery off-gases, acid gases, hydrogen cyanide, water, hydrocarbons, or combinations thereof wherein the acid gases comprise carbon dioxide, nitrogen oxide, sulfur dioxide, nitrogen dioxide, sulfur trioxide, hydrogen sulfide, or a combination thereof. In some embodiments, the acid gases desublimate, freeze, condense, or absorb into the droplets.

In some embodiments, mass is exchanged between the carrier gas and the droplets.

In some embodiments, the droplet generating device comprises a drip tray, spray nozzles, a protrusion droplet generator, capillary tubes, or combinations thereof. In some embodiments, the droplet generating device is installed in a direct-contact exchanger. In some embodiments, the direct-contact exchanger comprises a counter-current, a co-current, or a cross-current flow relative to the droplets.

In some embodiments, the contact liquid and melted solids are cooled through a heat exchanger, freezing the melted solids and forming the slurry.

In some embodiments, the direct-contact exchanger comprises a spray tower, an absorption tower, a combustor, a prilling tower, a packed column, or combinations thereof. In some embodiments, the spray tower further comprises a bubbler section. In some embodiments, the spray tower comprises a plurality of horizontal stages, the droplets from a first stage collected and fed to a next stage.

In some embodiments, the protrusion droplet generator comprises an opening through which a protrusion passes ending at a tip below the opening, the slurry passing through the opening and flowing along the protrusion, forming droplets that fall from the tip. In some embodiments, the protrusion is attached to a plate mounted above the opening. In some embodiments, the protrusion is attached to an interior side of the opening.

In some embodiments, the contact liquid and the melted solids are substantially immiscible near the melting point of the solids. In some embodiments, the contact liquid and the melted solids are separated through a liquid-liquid separator. In some embodiments, the contact liquid is more volatile than the melted solids and the contact liquid at least partially vaporizes into the carrier gas.

We claim:

1. A method for cooling a gas comprising:
passing a slurry through a droplet generating device to produce droplets of the slurry, wherein the slurry comprises a contact liquid and solids, and wherein a melting point of the solids is higher than a vaporization point of the contact liquid;
passing a carrier gas across the droplets to exchange heat between the carrier gas and the droplets, wherein at least a portion of the heat transferred to the droplets melts the solids; and
wherein the droplet generating device comprises a drip tray, spray nozzles, a protrusion droplet generator, capillary tubes, or combinations thereof, the droplet generating device is installed in a direct-contact exchanger, the direct-contact exchanger comprises a counter-current, a co-current, or a cross-current flow relative to the droplets, and the contact liquid and melted solids are cooled through a heat exchanger, freezing the melted solids and forming the slurry.

2. The method of claim 1, wherein the contact fluid comprises a mixture of a solvent and a compound, the solvent comprising water, hydrocarbons, liquid ammonia, liquid carbon dioxide, cryogenic liquids, or combinations thereof, and the compound comprising:
ionic compounds comprising potassium carbonate, potassium formate, potassium acetate, calcium magnesium acetate, magnesium chloride, sodium chloride, lithium chloride, calcium chloride, or combinations thereof; or,
organic compounds comprising glycerol, ammonia, propylene glycol, ethylene glycol, ethanol, methanol, hydrocarbons, or combinations thereof.

3. The method of claim 1, wherein the contact liquid comprises water, hydrocarbons, liquid ammonia, liquid carbon dioxide, cryogenic liquids, or combinations thereof.

4. The method of claim 3, wherein the hydrocarbons comprise 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof.

5. The method of claim 3, wherein the solids comprise carbon dioxide, nitrogen oxide, sulfur dioxide, nitrogen dioxide, sulfur trioxide, hydrogen sulfide, hydrogen cyanide, water, hydrocarbons, or combinations thereof.

6. The method of claim 3, wherein the carrier gas comprises combustion flue gas, syngas, producer gas, natural gas, steam reforming gas, light gases, refinery off-gases, acid gases, hydrogen cyanide, water, hydrocarbons, or combinations thereof wherein the acid gases comprise carbon dioxide, nitrogen oxide, sulfur dioxide, nitrogen dioxide, sulfur trioxide, hydrogen sulfide, or a combination thereof.

7. The method of claim 6, wherein mass is exchanged between the carrier gas and the droplets.

8. The method of claim 7, wherein the acid gases desublimate, freeze, condense, or absorb into the droplets.

9. The method of claim 1, wherein the contact liquid and the melted solids are substantially immiscible near the melting point of the solids.

10. The method of claim 9, further comprising separating the contact liquid and the melted solids through a liquid-liquid separator.

11. The method of claim 1, wherein the contact liquid is more volatile than the melted solids and the contact liquid at least partially vaporizes into the carrier gas.

12. A method for cooling a gas comprising:
passing a slurry through a droplet generating device to produce droplets of the slurry, wherein the slurry comprises a contact liquid and solids, and wherein a melting point of the solids is higher than a vaporization point of the contact liquid;
passing a carrier gas across the droplets to exchange heat between the carrier gas and the droplets, wherein at least a portion of the heat transferred to the droplets melts the solids; and
wherein the droplet generating device comprises a drip tray, spray nozzles, a protrusion droplet generator, capillary tubes, or combinations thereof, the droplet generating device is installed in a direct-contact exchanger, the direct-contact exchanger comprises a counter-current, a co-current, or a cross-current flow relative to the droplets, the direct-contact exchanger comprises a spray tower, and the spray tower further comprises a bubbler section.

13. The method of claim 12, wherein the spray tower comprises a plurality of horizontal stages, the droplets from a first stage collected and fed to a next stage.

14. A method for cooling a gas comprising:
- passing a slurry through a droplet generating device to produce droplets of the slurry, wherein the slurry comprises a contact liquid and solids, and wherein a melting point of the solids is higher than a vaporization point of the contact liquid;
- passing a carrier gas across the droplets to exchange heat between the carrier gas and the droplets, wherein at least a portion of the heat transferred to the droplets melts the solids; and
- wherein the droplet generating device comprises a protrusion droplet generator, and the protrusion droplet generator comprises an opening through which a protrusion passes ending at a tip below the opening, the slurry passing through the opening and flowing along the protrusion, forming droplets that fall from the tip.

15. The method of claim 14, wherein the protrusion is attached to a plate mounted above the opening or is attached to an interior side of the opening.

* * * * *